United States Patent [19]

Jacquot et al.

[11] Patent Number: 4,637,913
[45] Date of Patent: Jan. 20, 1987

[54] DEVICE FOR MEASURING THE POWER IN A NUCLEAR REACTOR

[75] Inventors: Jean-Paul Jacquot, Paris; Patrick Guillery, Saint Germain en Laye, both of France

[73] Assignee: Scandpower, Inc., Rockville, Md.

[21] Appl. No.: 510,591

[22] Filed: Jul. 5, 1983

[51] Int. Cl.⁴ .............................................. G21C 17/00
[52] U.S. Cl. ..................................... 376/247; 376/254
[58] Field of Search ....................... 376/247, 254, 255; 136/230, 232, 233

[56] References Cited

U.S. PATENT DOCUMENTS

| | | | |
|---|---|---|---|
| 3,848,466 | 11/1974 | Dial et al. | 376/247 |
| 4,118,626 | 10/1978 | Golstein et al. | 250/390 |
| 4,224,461 | 9/1980 | Snyder, Jr. et al. | 136/230 |
| 4,313,792 | 2/1982 | Smith | 376/247 |

FOREIGN PATENT DOCUMENTS

| | | |
|---|---|---|
| 2170109 | 9/1973 | France . |
| 2195799 | 3/1974 | France . |
| 2444947 | 7/1980 | France . |
| 1095072 | 12/1967 | United Kingdom . |

*Primary Examiner*—Salvatore Cangialosi
*Attorney, Agent, or Firm*—Eric P. Schellin

[57] ABSTRACT

The device comprises, in addition to a gamma thermometer with two junctions and insulated output conductive wires placed in a traversing sheath, an instrument placed outside the reactor for measuring the total current circulating between at least one of the conductive wires and the sheath under the action of the neutron and gamma fluxes in the core.

3 Claims, 3 Drawing Figures

DEVICE FOR MEASURING THE POWER IN A NUCLEAR REACTOR

FIELD OF THE INVENTION

The present invention is relative to measuring the thermal power released locally in the core of a nuclear reactor by two complementary physical principles which can be completed by measuring the local temperature of the coolant.

SUMMARY OF THE INVENTION

A device for measuring the local power in an area located in the core of a nuclear reactor is already known (French application FR-A No. 2,420,827). This device comprises a body which absorbs the gamma radiations, is placed at said area and comprises a thermocouple with two junctions, one of which is arranged so as to be brought to the temperature of the body and the other of which is at a reference temperature directly connected to the temperature of the reactor coolant at said area when the reactor is in stable operation. The junctions are connected to the outside by insulated conductive wires generally placed in a metallic sheath which traverses the reactor vessel. This device is currently called a "gamma thermometer".

The output signal of the differential thermocouple of the device supplies a signal representative of the power released by the core fuel at the measuring area. However, this signal has a long time constant and correlatively a limited pass band. It is not possible in practice to detect fluctuations or vibrations at frequencies above approximately 1 Hz. Yet, the knowledge of such fluctuations has a certain interest for the monitoring and the operation of the reactor.

The invention has the particular task of creating a device in which the above-mentioned limitation is eliminated to a large extent and which, in addition, can be constructed so as to permit the neutron flux to be taken into account.

The approach adopted to this end consists of rendering the device capable of also assuring the functions of the apparatus frequently called a "collectron" or designated by the abbreviation SPND (Self Power Neutron Detector), making use of the fact that in the neutron and gamma fluxes of the core, an electric current appears between a sheath and an insulated conductor which it contains. A device in accordance with the invention consequently comprises a gamma thermometer like the one defined above, comprising, in addition, means placed outside the reactor for measuring the total current circulating between at least one of the output wires and the sheath under the action of the gamma and neutron fluxes in the core.

The wires of the thermocouples of each gamma thermometer are themselves the seat of a collectron effect representing the integral of the gamma and neutron flux to the right of the thermocouple associated with the gamme thermometer. In order to permit the local measuring of the power to the right of a well-localized sensitive element while removing the effect due to the wires, the device of the invention advantageously uses a thermocouple with three wires.

Generally, several devices of the type defined above are inserted in the same conduit traversing the vessel wall and their thermocouples are at different levels.

It is possible to make the device sensitive to a determined radiation (neutrons or gamma radiation) and to select the pass band and thus to adjust the pass band by the appropriate choice of the constituents of the device and in particular of the nature of a positioned element which is added to the functions of the thermocouple and housed in the same sheath. The use of a sensitive element made of platinum permits, for example, the pass band of the device to be extended in its entirety using only gamma radiations.

The implementation of the invention does not encounter any particular technical problems: The construction of multi-junction, multi-wire thermocouples with a small diameter of the protective sheath is known. It is evident that the invention presents a great flexibility of use, since it permits two distinct measurements of the gamma and neutron fluxes to be obtained as well as a measurement of temperature.

These and further constructional and operational characteristics of the invention will be more evident from the detailed description given hereinafter with reference to the figures of the accompanying drawings which illustrate one preferred embodiment and alternates by way of non-limiting examples.

DESCRIPTION OF THE PREFERRED EMBODIMENT

Figure 1:
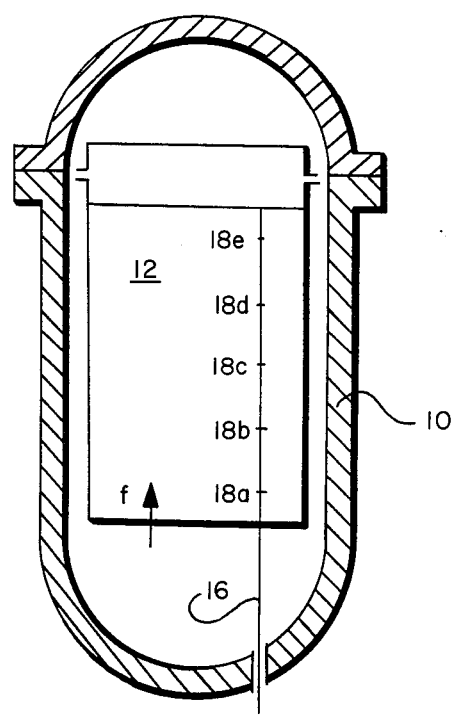
FIG. 1 is a very simplified section showing a nuclear reactor which can be equipped with a device according to the invention.

Referring now to the drawings wherein reference numerals are used to designate parts throughout the various figures thereof, there is shown in FIG. 1 the vessel 10 of a nuclear reactor which is assumed to be of the pressurized water type in the following. This vessel contains core 12 of the reactor, constituted by juxtaposed fuel assemblages, each of which contains a bundle of vertical fuel rods. The core is traversed by an ascending current of pressurized water which constitutes the coolant and is schematically indicated by arrow f.

Every nuclear reactor should be provided with devices for measuring the neutron flux and/or the local power at various areas of the core. A device which is especially well adapted to measuring the local power is constituted by the device currently called a "gamma thermometer", a description of which can be found in French application FR-A No. 2,420,827 previously mentioned. This device comprises several measuring thermocouples in the same conduit 16 which traverses the reactor vessel and penetrates into the core, the areas of which thermocouples are designated by 18a, 18b . . . 18e in the figure.

Figure 2:
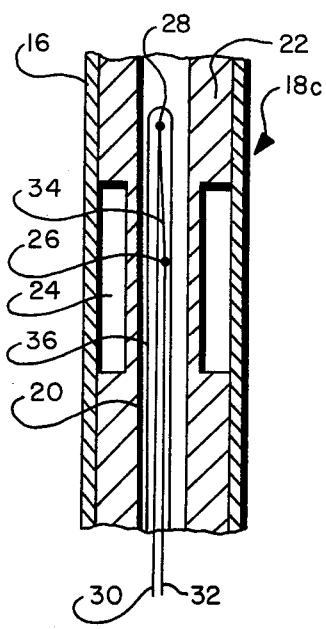
FIG. 2 is a detailed section which shows a fragment of a gamma thermometer which forms part of the device according to the invention.

A thermocouple, one of which is shown in FIG. 2, is placed in each of the measuring area. This thermocouple is located in central hole 20 of the body which absorbs gamma radiation 22. This body, which is cylindrical in shape, is enclosed by a tube which constitutes conduit 16. A recess 24 is put in body 22 at each of the areas 18a, . . . 18e. This recess constitutes a break in the flow path of the heat in body 22 toward tube 16 and the refrigerant. One of the junctions 26 of the thermocouple is placed essentially at the level of the middle of break 24, while the other junction 28 is placed at a level adjacent to that of the break, where the heat flow from body 22 is essentially radial.

The two junctions 26 and 28 can be made in the following manner: Two insulated wires 30 and 32 of a metal which constitutes a first component of a thermoelectric couple (Chromel, for example) are run from the outside to junctions 26 and 28. A piece 34 of a metal which constitutes the other component of the couple (Alumel, for example) is connected by welding to wires 30 and 32 to constitute junctions 26 and 28.

Wires 30 and 32 as well as the junctions are situated in a protective metallic sheath 36 generally made of stainless steel. This sheath is generally occupied by a pulverized mass of a mineral insulation which is selected so that it is not broken down by the radiations inside the core.

Figure 3:
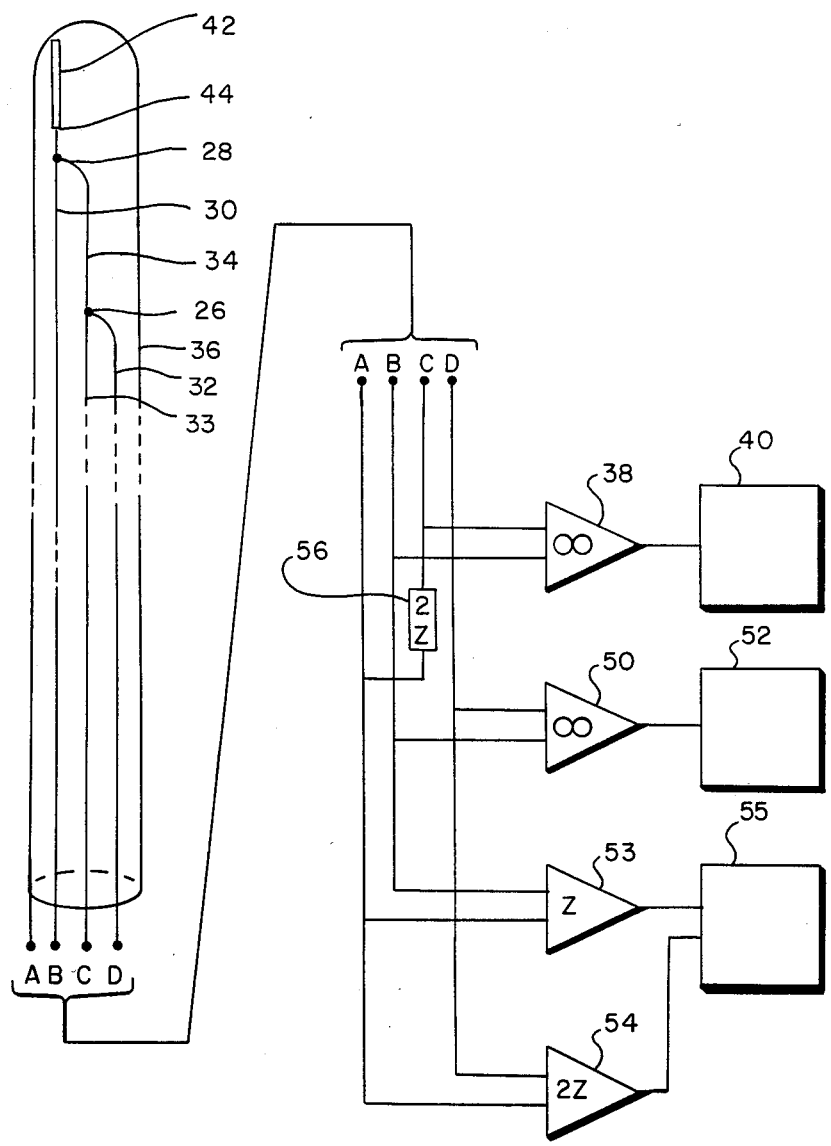
FIG. 3 is a basic diagram of a device according to the invention which includes a gamma thermometer and a collectron.

Wires 30 and 32 are connected outside the core to a unit for measuring the voltage supplied by the differential thermocouple, indicated in diagrammatic fashion in FIG. 3 by voltage amplifier 50 and measuring device 52.

This unit, together with the thermocouple, constitutes a gamma thermometer and supplies a signal for measuring local power.

A second measuring unit similar to the first supplies a measuring signal of the absolute temperature of cold junction 28. It also comprises voltage amplifier 38 and measuring apparatus 40. One input of amplifier 38 is connected to wire 30 and the other input to wire 33 of the same nature as piece 34 and connected to junction 28.

Each thermoelectric couple located to the right of a recess 24 is associated in the same manner with a measuring unit. It is thus possible to determine the local thermal power at numerous areas of the core to deduce therefrom the division of power.

The elements of the device described up to this point have a general constitution which is known and which permits the average power in stabilized operation to be determined. But the pass band is limited.

The device of the invention uses the divided current which appears between sheath 36 and a sensitive element 42 or emitter. This element is a piece of platinum wire, for example, connected electrically to wire 30 at point 44.

This current is measured by a current amplifier 53 with input impedance Z mounted between wire 30 and sheath 36. In order to compensate the collectron current which is due to the wires and which represents the integral of the neutron and gamma flux cut by the various wire of the thermocouple, a second collectron current is measured between wire 32 and sheath 36. This current is measured by current amplifier 54, whose input impedance is 2Z. Amplifiers 53 and 54 are connected to calculating means 55 which calculate the pure collectron signal due to emitter 42 by a formula of the approximate type: $I=4(I_1-I_2)$ in which I is the pure collectron current due to element 42, $I_1$ is the current measured between wire 30 and sheath 36 and $I_2$ is the current measured between wire 32 and sheath 36.

In order that the assembly is balanced, loading resistor 56 with impedance 2Z is placed between wire 33 (of the same nature as piece 34, e.g. Alumel) and sheath 36. Instead of the assembly of FIG. 3 with four amplifiers, it is possible to use a simplified assembly comprising switches which permit the one or the other of the measurements to be performed.

The calculating means 40, 52 and 55 are numeric or analog and can be provided to supply supplementary indications. In particular, the signals supplied by amplifiers 38 and 50 can be used to obtain the temperature of the refrigerant and the corrected gamma flux, according to the process described and claimed in the FR patent application filed the same day as the present application for "Process and Device of Measuring the Local Thermal Power in a Nuclear Reactor", which uses a heating element.

The device also permits the gamma and neutron fluxes to be measured simultaneously and at the same point by using an appropriate emitter 42, made, e.g., for rhodium or vanadium. Calculating means 52 and 55 can then be coupled so as to establish correlations between the signals of gamma and neutron origin.

Finally, the device can be used to measure the gamma flux by two different physical principles; if a platinum emitter 42 is used, for example, a device is obtained which only uses gamma sources but whose pass band extends over several hundred Herz due to the signal supplied by emitter 42 to the extent that amplifiers 53 and 54 as well as calculating means 55 have a sufficient pass band. These calculating means 55 can be provided to perform various treatments, for example:

A spectral analysis of the signal corresponding to the collectron in order to obtain a power spectrum of the collectron noise representative of vibratory phenomena (e.g. the mechanical vibrations of the core). A simultaneous spectral analysis of two paths permits, by a measurement of difference in phase, an estimation of the speed of the coolant. Means 55 can then comprise, for example, a spectral analyser with a rapid Fourier transform or FFT like the INTERTECHNIQUE IN 110 analyser or the NICOLET SCIENTIFIC 660.

A rapid succession of the fluxes in order to use the device in safety systems customarily installed in nuclear reactors.

The invention is not limited to the preferred embodiment and alternates heretofore described, to which variations and improvements may be made, consisting of mechanically and electrically equivalent modifications to component parts, without leaving the scope of protection of the present patent, the characteristics of which are summarized in the following claims.

What is claimed is:

1. Device for measuring the local power in the core area of a nuclear reactor comprising:
   a body which absorbs the gamma radiations placed at this area and a thermocouple with two junctions, one of which is arranged so that it is brought to the temperature of the body and the other of which is at a reference temperature directly connected to the temperature of the coolant of the reactor at this area during stablized operation of the reactor, which junctions are connected to the outside by insulated output conductive wires placed in a metallic sheath which traverses the reactor vessel;
   an emitter is connected to one of the wires in the measuring area and that said measuring means are provided to measure the current between said sheath and said emitter, said emitter is made of a vanadium which supplies a collectron current which is a function of the neutron radiation; and
   means placed outside the reactor for measuring the total current circulating between at least one of said output conductive wires and said sheath under the action of the neutron and gamma fluxes in the core.

2. Device according to claim 1, characterized in that the measuring means are provided to perform a correlation between the signals representative of the gamma and neutron radiation fluxes at the same area.

3. Device according to one of claims 1 or 2, characterized in that it comprises a supplementary output wire connected to the junction at the temperature of the coolant made of a material of the same nature as that which connects said two junctions, and that said measuring means are provided for measuring the output signals of said thermocouples constituted in this manner and the currents between said supplementary wire and said sheath.

* * * * *